(12) United States Patent
Wada

(10) Patent No.: US 9,891,446 B2
(45) Date of Patent: Feb. 13, 2018

(54) IMAGING APPARATUS AND IMAGE BLUR CORRECTION METHOD

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/629,158

(22) Filed: Jun. 21, 2017

(65) Prior Publication Data
US 2017/0285365 A1    Oct. 5, 2017

Related U.S. Application Data

(63) Continuation of application No. PCT/JP2015/082155, filed on Nov. 16, 2015.

(30) Foreign Application Priority Data

Dec. 22, 2014   (JP) ................. 2014-258976

(51) Int. Cl.
*G03B 5/00* (2006.01)
*G02B 27/64* (2006.01)
*G06T 5/00* (2006.01)
*H04N 5/232* (2006.01)

(52) U.S. Cl.
CPC ............ *G02B 27/646* (2013.01); *G06T 5/003* (2013.01); *H04N 5/23248* (2013.01); *G03B 5/00* (2013.01);
(Continued)

(58) Field of Classification Search
CPC ....................................................... G03B 5/00
(Continued)

(56) References Cited

U.S. PATENT DOCUMENTS

2005/0276590 A1* 12/2005 Ishikawa ............... G02B 27/646
                                                        396/55
2007/0147813 A1*  6/2007 Washisu ............... G02B 27/646
                                                        396/53
(Continued)

FOREIGN PATENT DOCUMENTS

JP       2011-33881 A    2/2011
JP        4717651 B2     7/2011
(Continued)

OTHER PUBLICATIONS

International Search Report, issued by International Searching Authority in corresponding International Application No. PCT/JP2015/082155, dated Feb. 16, 2016, (PCT/ISA/210).
(Continued)

*Primary Examiner* — Clayton E Laballe
*Assistant Examiner* — Kevin Butler
(74) *Attorney, Agent, or Firm* — Sughrue Mion, PLLC

(57) ABSTRACT

An imaging apparatus includes: a detection unit that detects accelerations in directions of three orthogonal axes; a generation unit that, in a case in which a difference between the magnitude of a resultant vector of the accelerations in the directions of the three orthogonal axes and the magnitude of the acceleration of gravity is equal to or less than a predetermined threshold value, generates a reference vector using the resultant vector; and a correction unit that corrects an image blur caused by translational shakes in directions of two orthogonal axes perpendicular to at least an optical axis of an imaging optical system, using the reference vector, on the basis of the accelerations in the directions of the three orthogonal axes.

17 Claims, 10 Drawing Sheets

(52) U.S. Cl.
CPC ........... *G03B 2205/0007* (2013.01); *G03B 2217/005* (2013.01); *G06T 5/002* (2013.01); *H04N 5/23287* (2013.01)

(58) Field of Classification Search
USPC .......................................... 396/55
See application file for complete search history.

(56) References Cited

U.S. PATENT DOCUMENTS

| | | | |
|---|---|---|---|
| 2007/0183762 A1* | 8/2007 | Washisu | G03B 5/00 396/53 |
| 2010/0074605 A1 | 3/2010 | Washisu | |
| 2014/0063279 A1* | 3/2014 | Ogura | H04N 5/23209 348/222.1 |

FOREIGN PATENT DOCUMENTS

| | | | | |
|---|---|---|---|---|
| JP | 2012-204862 A | 10/2012 | | |
| JP | 2013-250414 A | 12/2013 | | |
| JP | 2013250414 | * 12/2013 | ............... | G03B 5/00 |
| JP | 2014-199964 A | 10/2014 | | |

OTHER PUBLICATIONS

Written Opinion, issued by International Searching Authority in corresponding International Application No. PCT/JP2015/082155, dated Feb. 16, 2016, (PCT/ISA/237).

* cited by examiner

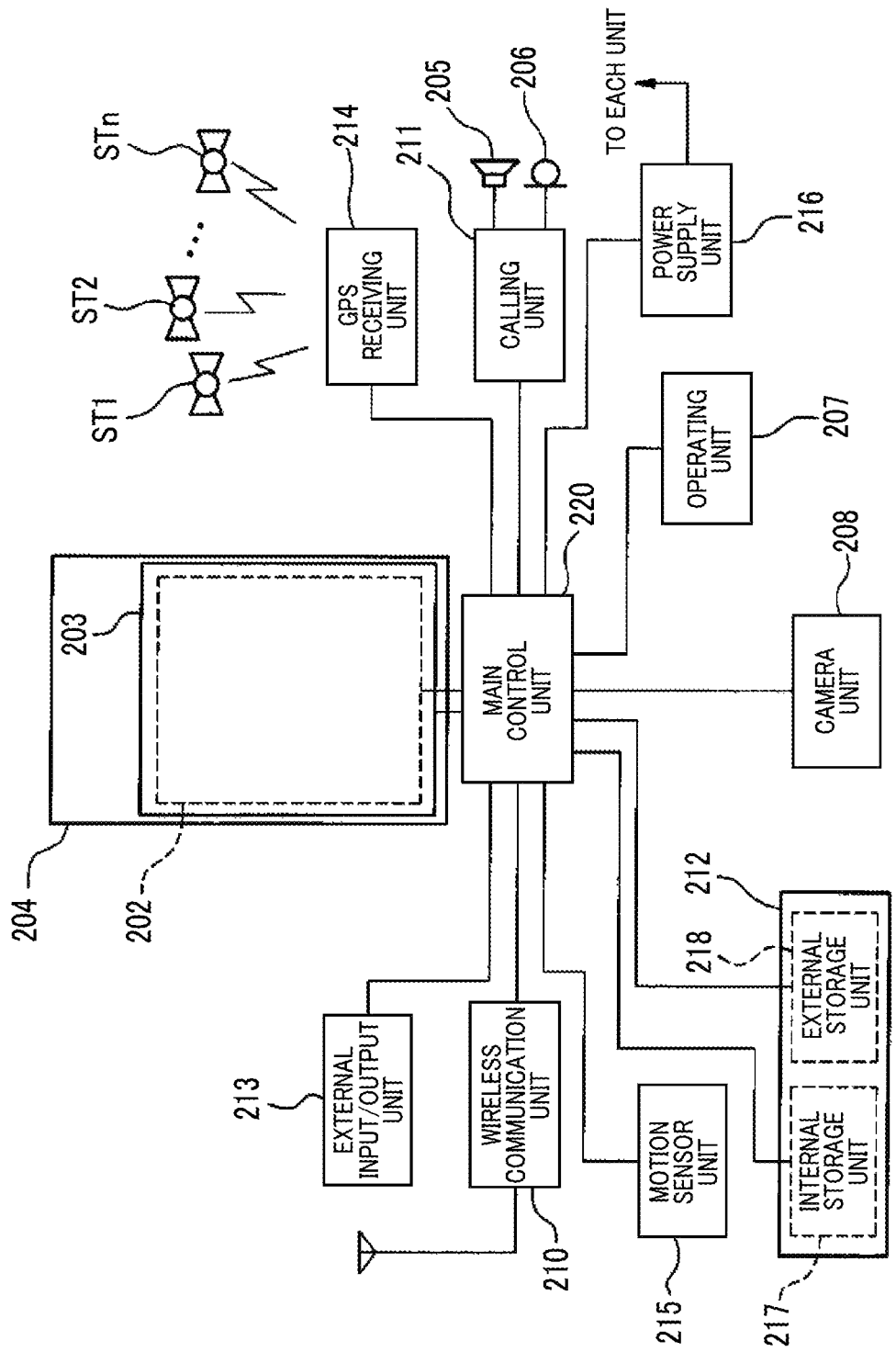

IMAGING APPARATUS AND IMAGE BLUR CORRECTION METHOD

CROSS REFERENCE TO RELATED APPLICATION

This is a continuation of International Application No. PCT/JP2015/082155 filed on Nov. 16, 2015, and claims priority from Japanese Patent Application No. 2014-258976 filed on Dec. 22, 2014, the entire disclosures of which are incorporated herein by reference.

BACKGROUND OF THE INVENTION

1. Field of the Invention

The present invention relates to an imaging apparatus and an image blur correction method.

2. Description of the Related Art

An imaging apparatus has been known which corrects an image blur caused by the shake of the imaging apparatus due to, for example, a hand shake. The shake of the imaging apparatus includes an angular shake of the imaging apparatus about an axis perpendicular to an optical axis and a translational shake of the imaging apparatus in an axial direction perpendicular to the optical axis.

In the correction of an image blur caused by a rotational shake, in general, an angular velocity about the axis perpendicular to the optical axis is detected and the amount of rotational shake of the imaging apparatus is calculated. Then, a correction optical system or an imaging element is moved such that an image blur on an imaging surface of the imaging element is cancelled, on the basis of the amount of rotational shake.

In the correction of an image blur caused by the translational shake, acceleration in an axial direction perpendicular to the optical axis is detected and the amount of translational shake of the imaging apparatus is calculated. Then, the correction optical system or the imaging element is moved such that an image blur on the imaging surface of the imaging element is cancelled, on the basis of the amount of translational shake.

An acceleration sensor is used to detect the translational shake of an imaging apparatus. However, since a gravitational acceleration component is included in the output of the acceleration sensor, it is necessary to remove the gravitational acceleration component. A shake correction device disclosed in JP2013-250414A calculates the direction of the acceleration of gravity (initial posture), on the basis of initial acceleration in a stationary state and a change in angular velocity, using the equation of motion of a camera as an inertial body, and removes a gravitational acceleration component calculated by an operation from an output value from an acceleration sensor. JP4717651B discloses an image blur correction device that calculates a change in gravity applied to an accelerometer on the basis of a change in a hand shake angle signal from a gyroscope, calculates the difference between a hand shake acceleration signal from the accelerometer and a signal associated with the calculated change in gravity, and removes an error in the output of the accelerometer caused by the influence of gravity.

SUMMARY OF THE INVENTION

In the devices disclosed in JP2013-250414A and JP4717651B, an angular velocity detected by a sensor is used to derive a gravitational acceleration component. However, when errors caused by the displacement of the angular velocity are accumulated, it is difficult to accurately remove a gravitational acceleration component from an acceleration signal. Even when an image blur is corrected on the basis of the acceleration signal from which a gravitational acceleration component has not been removed, image deterioration is not resolved.

The invention has been made in view of the above-mentioned problems and an object of the invention is to provide an imaging apparatus and an image blur correction method that can correct an image blur caused by a translational shake with high accuracy.

According to an aspect of the invention, there is provided an imaging apparatus comprising: an acceleration detection unit that detects accelerations of the imaging apparatus in directions of three orthogonal axes; a reference vector generation unit that, in a case in which a difference between a magnitude of a resultant vector of the accelerations in the directions of the three orthogonal axes detected by the acceleration detection unit and a magnitude of acceleration of gravity is equal to or less than a predetermined threshold value, generates a reference vector using the resultant vector; and a shake correction unit that corrects an image blur caused by translational shakes in directions of two orthogonal axes perpendicular to at least an optical axis of an imaging optical system, using the reference vector, on the basis of the accelerations in the directions of the three orthogonal axes detected by the acceleration detection unit.

According to another aspect of the invention, there is provided an image blur correction method comprising: a generation step of, in a case in which a difference between a magnitude of a resultant vector of accelerations in directions of three orthogonal axes, which act on an imaging apparatus, and a magnitude of acceleration of gravity is equal to or less than a predetermined threshold value, generating a reference vector using the resultant vector; and a correction step of correcting an image blur caused by translational shakes in directions of two orthogonal axes perpendicular to at least an optical axis of an imaging optical system, using the reference vector, on the basis of the accelerations in the directions of the three orthogonal axes which act on the imaging apparatus.

According to the invention, it is possible to provide an imaging apparatus and an image blur correction method that can correct an image blur caused by a translational shake with high accuracy.

BRIEF DESCRIPTION OF THE DRAWINGS

FIG. 10 is a diagram illustrating the structure of the imaging apparatus illustrated in FIG. 9.

EXPLANATION OF REFERENCES

Figure 1:
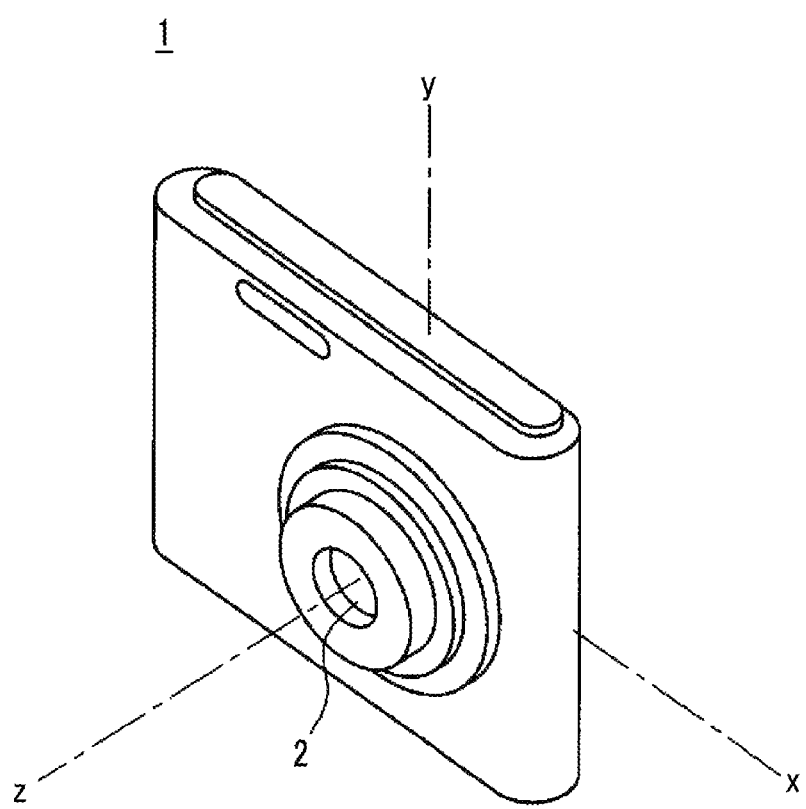
FIG. 1 is a diagram illustrating the outward appearance of an example of an imaging apparatus for describing an embodiment of the invention.

1: digital camera
2: imaging optical system
2a: movable lens (focus lens)
3: imaging element
4: focusing unit
5: focus driving unit
6: control unit
20: acceleration detection unit
21: correction driving unit
22x, 22y, 22z: acceleration sensor
23: reference vector generation unit
24, 34: shake correction control unit
31: angular velocity detection unit
32: gravitational acceleration estimation unit
33: gravitational acceleration correction unit

DESCRIPTION OF THE PREFERRED EMBODIMENTS

Figure 2:
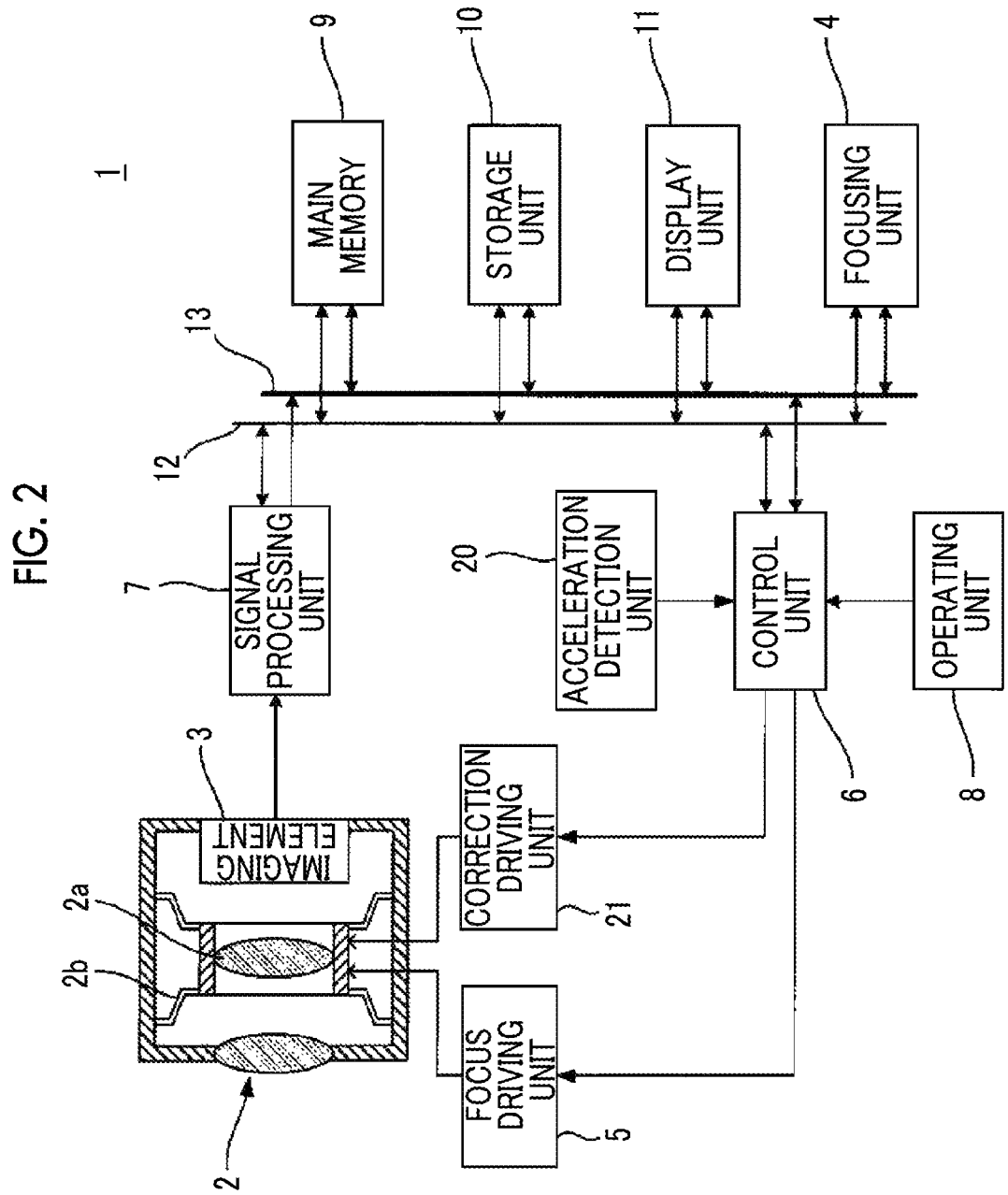
FIG. 2 is a block diagram illustrating the structure of the imaging apparatus illustrated in FIG. 1.

FIG. 1 illustrates the outward appearance of an example of an imaging apparatus for describing an embodiment of the invention and FIG. 2 illustrates the structure of the imaging apparatus illustrated in FIG. 1.

A digital camera 1 which is an example of the imaging apparatus illustrated in FIGS. 1 and 2 comprises an imaging optical system 2 including, for example, a movable lens 2a that is supported so as to be movable in an optical axis direction (z-axis direction) and the directions (an x-axis direction and a y-axis direction) of two axes perpendicular to the optical axis direction, an imaging element 3 that captures an image of an object through the imaging optical system 2, a focusing unit 4 that determines a focus position of the movable lens 2a, a focus driving unit 5 that moves the movable lens 2a in the z-axis direction, and a control unit 6.

The movable lens 2a is elastically supported by a holder spring 2b so as to be movable in the directions of the x-axis, the y-axis, and the z-axis in a housing of the digital camera 1.

For example, a charge coupled device (CCD) image sensor or a complementary metal oxide semiconductor (CMOS) image sensor is used as the imaging element 3.

A signal processing unit 7 performs analog signal processing, such as a correlated double sampling process, for an output signal from the imaging element 3 to convert the output signal into a digital signal. Then, the signal processing unit 7 performs digital signal processing, such as an interpolation operation, a gamma correction operation, or an RGB/YC conversion process, for the digital signal obtained by converting the output signal from the imaging element 3 to generate image data.

The focusing unit 4 determines a focus state, using an AF system, such as a contrast system, on the basis of the image data generated by the signal processing unit 7 and determines the focus position of the movable lens 2a. Then, the focusing unit 4 outputs a focusing signal indicating the determined focus position to the control unit 6.

The focus driving unit 5 is a so-called voice coil motor and includes a magnet and a driving coil which are disposed so as to face each other. One of the magnet and the driving coil is fixed to the movable lens 2a. A driving force to move the movable lens 2a in the z-axis direction is generated according to a driving current supplied to the driving coil.

An instruction signal, such as imaging instruction from a user, is input from an operating unit 8 to the control unit 6. The control unit 6 drives the imaging element 3 in response to the imaging instruction such that the imaging element 3 captures images.

The digital camera 1 includes a main memory 9 that stores, for example, setting information, a storage unit 10 including a storage medium, such as a memory card that stores the image data generated by the signal processing unit 7, and a display unit 11 including a display panel, such as a liquid crystal display panel that displays a menu or the image data generated by the signal processing unit 7.

The focusing unit 4, the signal processing unit 7, the main memory 9, the storage unit 10, and the display unit 11 are connected to each other by a control bus 12 and a data bus 13 and are controlled by commands from the control unit 6.

A focusing signal indicating the focus position of the movable lens 2a is input from the focusing unit 4 to the control unit 6. The control unit 6 controls the focus driving unit 5 on the basis of the focusing signal such that the movable lens 2a is held at the focus position indicated by the focusing signal. In this example, the focus driving unit 5 is a voice coil motor and the focusing signal indicates the value of a driving current supplied to the driving coil.

The digital camera 1 further comprises an acceleration detection unit 20 that detects acceleration acting on the digital camera 1 and a correction driving unit 21 that corrects an image blur on an imaging surface of the imaging element 3 caused by the shake of the digital camera 1. In this example, the movable lens 2a which functions as a focus lens and is moved in the z-axis direction by the focus driving unit 5 is moved in the directions of the x-axis and the y-axis by the correction driving unit 21 to correct an image blur under the control of the control unit 6.

An image blur correction lens may be provided separately from the movable lens 2a as the focus lens and may be moved in the directions of the x-axis and the y-axis to correct an image blur. Alternatively, the imaging element 3 may be moved in the directions of the x-axis and the y-axis to correct an image blur. In a case, the movable lens 2a may be movable in the z-axis direction.

Figure 3:
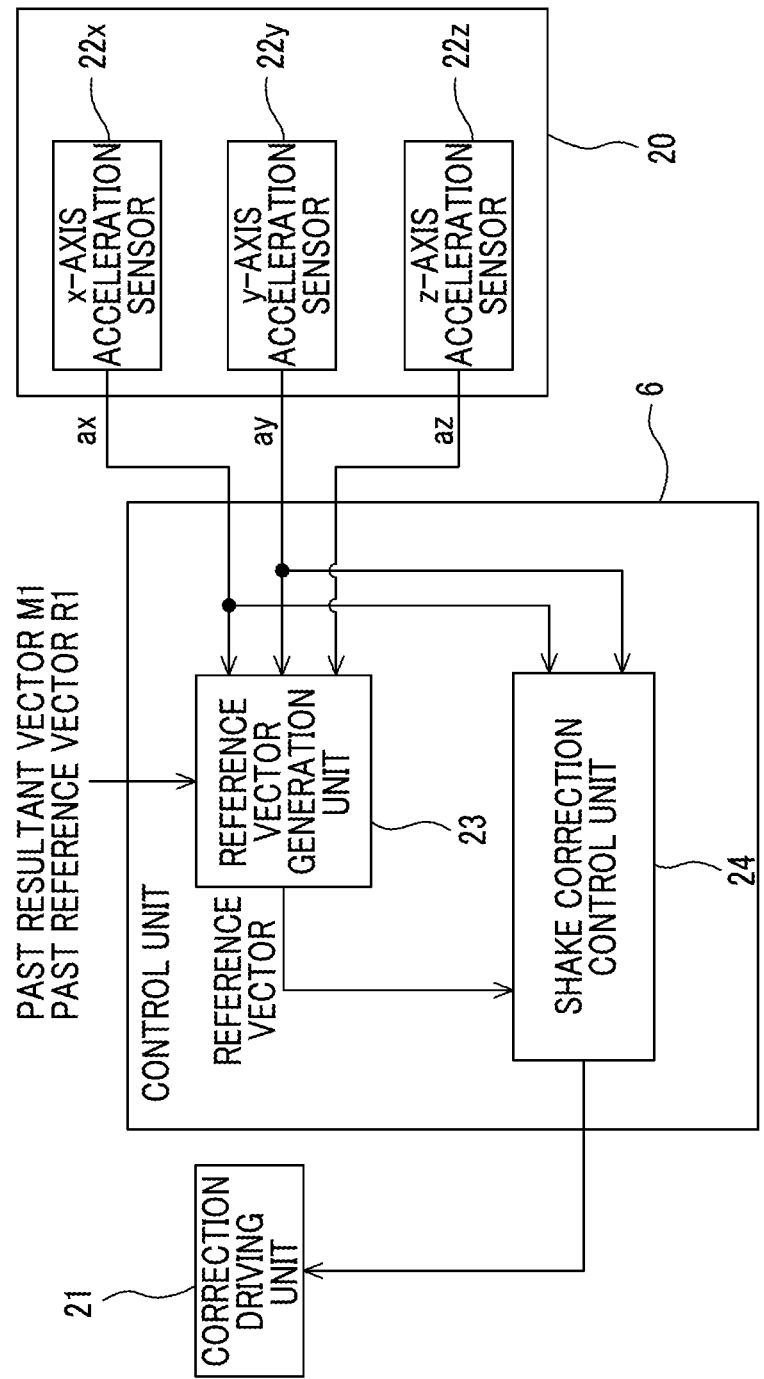
FIG. 3 is a diagram illustrating the structure of an example of an image blur correction system of the imaging apparatus illustrated in FIG. 1.

FIG. 3 illustrates an example of the functional block of an image blur correction system of the digital camera 1.

The acceleration detection unit 20 includes an acceleration sensor 22x that detects acceleration in the x-axis direction, an acceleration sensor 22y that detects acceleration in the y-axis direction, and an acceleration sensor 22z that detects acceleration in the z-axis direction.

The control unit 6 includes a reference vector generation unit 23 that generates a reference vector of acceleration acting on the digital camera 1 and a shake correction control unit 24 that controls the correction driving unit 21.

The reference vector generation unit 23 calculates the magnitude (|M|) of a resultant vector (composite vector) M of the accelerations in the directions of three orthogonal axes which is detected by the acceleration detection unit 20. The magnitude of the resultant vector M of the accelerations is calculated by the sum $(ax^2+ay^2+az^2)$ of squares of acceleration components ax, ay, and az which are detected by the acceleration sensors 22x, 22y, and 22z, respectively. The reference vector generation unit 23 stores the calculated resultant vector M in the main memory 9 so as to be associated with the calculation time.

In addition, when the absolute value of a difference C (=|M|−|G|) between the calculated magnitude |M| of the resultant vector M and the magnitude |G| of the acceleration of gravity, which is a predetermined value, is equal to or less than a predetermined threshold value Cth, the reference vector generation unit 23 calculates a reference vector R of the acceleration, using a recursive filter using a weighted average which will be described below. In a case in which the absolute value of the difference C is greater than the predetermined threshold value Cth, the reference vector generation unit 23 does not calculate the reference vector R. The reference vector generation unit 23 stores the calculated reference vector R in the main memory 9 so as to be associated with the calculation time. The magnitude |G| of the acceleration of gravity is a predetermined value.

The recursive filter which is used by the reference vector generation unit 23 to calculate the reference vector R uses the latest resultant vector M0 and the current reference vector (hereinafter, referred to as a "past reference vector") R1 which has been previously calculated and stored in the main memory 9, which will be described below. The sum of a weight coefficient α by which the latest resultant vector M0 is multiplied and a weight coefficient β by which the past reference vector R1 is multiplied is 1.

An example of the recursive filter is αM0+βR1.

The vector multiplied by the weight coefficient β is not limited to the past reference vector R1 and may be a past resultant vector M1 stored in the main memory 9, which will be described below.

Another example of the recursive filter is αM0+βM1.

The past resultant vector or the past reference vector used to calculate the reference vector R is not limited to one vector and may be a plurality of vectors as described above.

Still another example of the recursive filter is αM0+βR1+ . . . +γRn (Rn is a reference vector calculated n times before).

Yet another example of the recursive filter is αM0+βM1+ . . . +γMn (Mn is a resultant vector obtained n times before).

In this case, the sum of weight coefficients by which each resultant vector or each reference vector is multiplied is 1.

Figure 4:
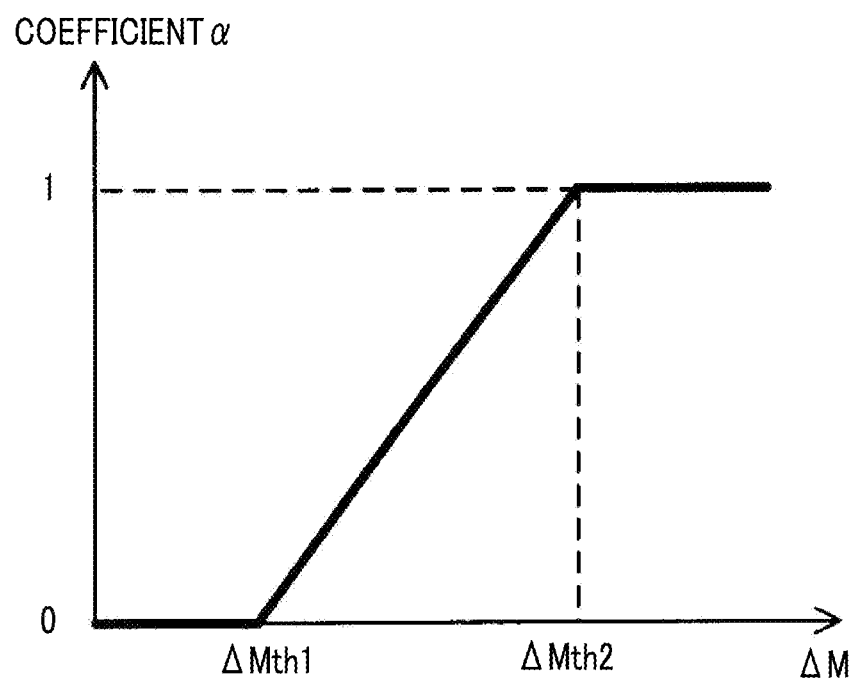
FIG. 4 is a diagram illustrating the relationship between a weight coefficient by which the latest resultant vector is multiplied and a variation in the latest resultant vector from a past resultant vector or a past reference vector.

When the recursive filter used to calculate the reference vector R is generated, the reference vector generation unit 23 sets the value of the weight coefficient α. As illustrated in FIG. 4, the weight coefficient α is set to a predetermined value of 0 to 1 according to a variation ΔM in the latest resultant vector M0 from the past resultant vector M1 or the past reference vector R1. That is, the weight coefficient α is set to 0 when the variation ΔM is in the range of 0 to a predetermined threshold value ΔMth1, is set to 1 when the variation ΔM is equal to or greater than a predetermined threshold value ΔMth2 greater than the predetermined threshold value ΔMth1, and is set to a value of 0 to 1 which is proportional to the magnitude of the variation ΔM when the variation ΔM is a value between the threshold value ΔMth1 and the threshold value ΔMth2. The calculation of the variation ΔM is performed for each axial component of the three orthogonal axes and the setting of the value of the weight coefficient α is performed for each axial component of the three orthogonal axes.

The shake correction control unit 24 performs second-order integration for a difference value obtained by subtracting an x-axis component of a new reference vector R0 calculated by the reference vector generation unit 23 from acceleration in the x-axis direction detected by the acceleration sensor 22x to calculate the amount of translational shake in the x-axis direction. Similarly, the shake correction control unit 24 performs second-order integration for a difference value obtained by subtracting a y-axis component of the new reference vector R0 calculated by the reference vector generation unit 23 from acceleration in the y-axis direction detected by the acceleration sensor 22y to calculate the amount of translational shake in the y-axis direction.

Then, the shake correction control unit 24 calculates the amounts of movement of the movable lens 2a in the directions of the x-axis and the y-axis on the basis of the calculated amounts of translational shakes in the directions of the x-axis and the y-axis.

Then, the shake correction control unit 24 controls the correction driving unit 21 such that the movable lens 2a is moved in the directions of the x-axis and the y-axis by the calculated amounts of movement of the movable lens 2a. In this way, an image blur caused by the translational shakes of the digital camera 1 is corrected.

A shake correction unit that corrects an image blur is formed by the shake correction control unit 24, the correction driving unit 21, and the movable lens 2a as a correction lens.

The correction driving unit 21 may be a voice coil motor, similarly to the focus driving unit 5.

Figure 5:
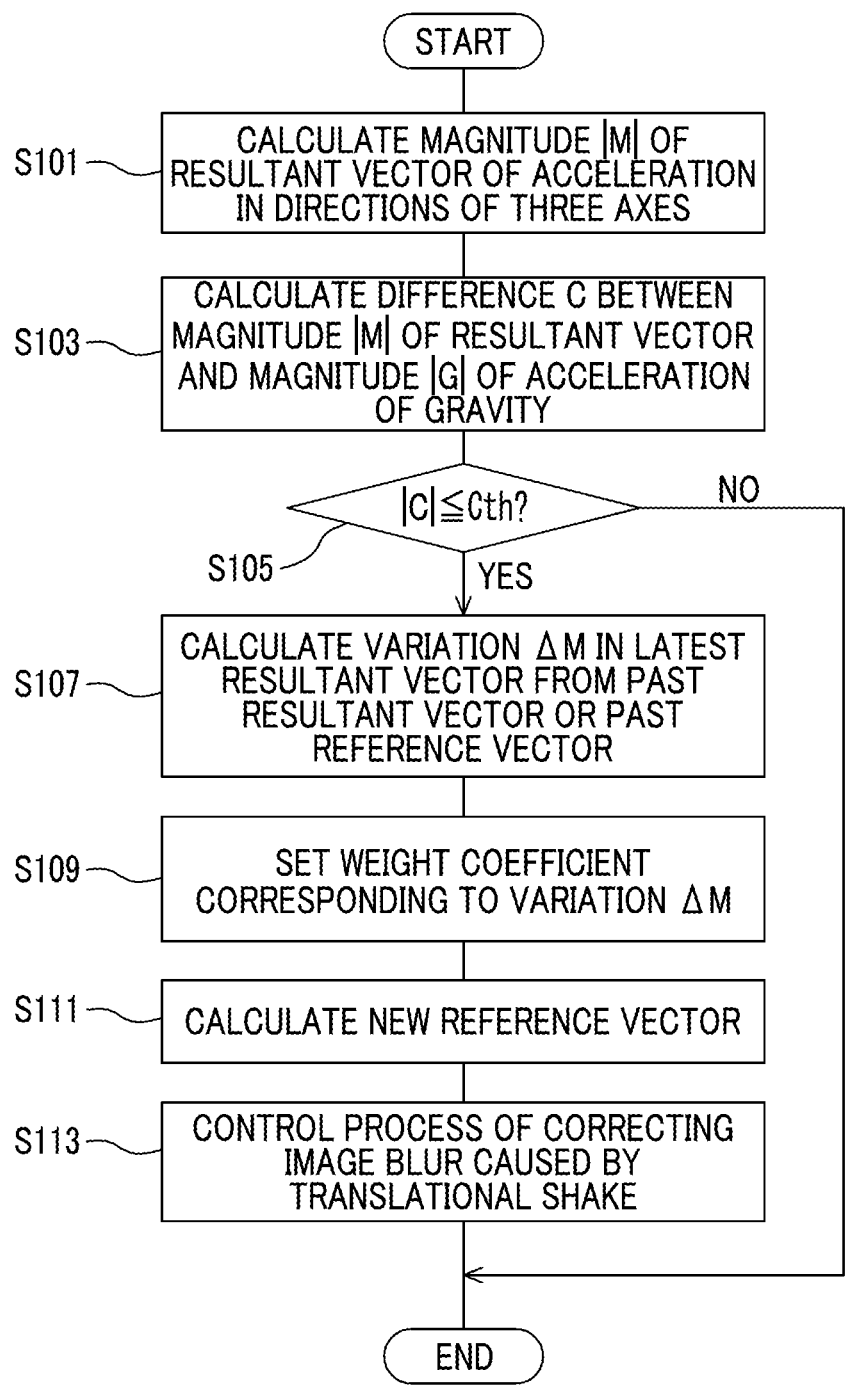
FIG. 5 is a flowchart illustrating the operation of the image blur correction system illustrated in FIG. 3.

FIG. 5 is a flowchart illustrating the operation of the image blur correction system illustrated in FIG. 3. As illustrated in FIG. 5, the reference vector generation unit 23 included in the control unit 6 calculates the magnitude |M| of the resultant vector M of the accelerations in the directions of three orthogonal axes detected by the acceleration detection unit 20 (Step S101). Then, the reference vector generation unit 23 calculates the difference C (=|M|−|G|) between the magnitude |M| of the resultant vector M calculated in Step S101 and the magnitude |G| of the acceleration of gravity which is a predetermined value (Step S103). Then, the reference vector generation unit 23 determines whether the absolute value of the difference C calculated in Step S103 is equal to or less than the threshold value Cth (|C|≤Cth) (Step S105). When |C|≤Cth is satisfied, the process proceeds to Step S107. When |C|>Cth is satisfied, the process ends.

In Step S107, the reference vector generation unit 23 calculates the variation ΔM in the latest resultant vector from the past resultant vector or the past reference vector for each axial component of the three orthogonal axes. Then, the reference vector generation unit 23 sets the weight coefficient α corresponding to the variation ΔM for each axial component of the three orthogonal axes and sets other weight coefficients corresponding to the weight coefficient α (Step S109). Then, the reference vector generation unit 23 calculates a new reference vector using a recursive filter using the weight coefficient set in Step S109, the latest resultant vector, and the past reference vector or resultant vector (Step S111).

Finally, the shake correction control unit 24 controls a process of correcting an image blur caused by the translational shakes in the directions (the x-axis direction and the y-axis direction) of two orthogonal axes perpendicular to the optical axis direction (z-axis direction), on the basis of the accelerations in the directions of the three orthogonal axes detected by the acceleration detection unit 20, using the reference vector calculated in Step S111 (Step S113).

Figure 6:
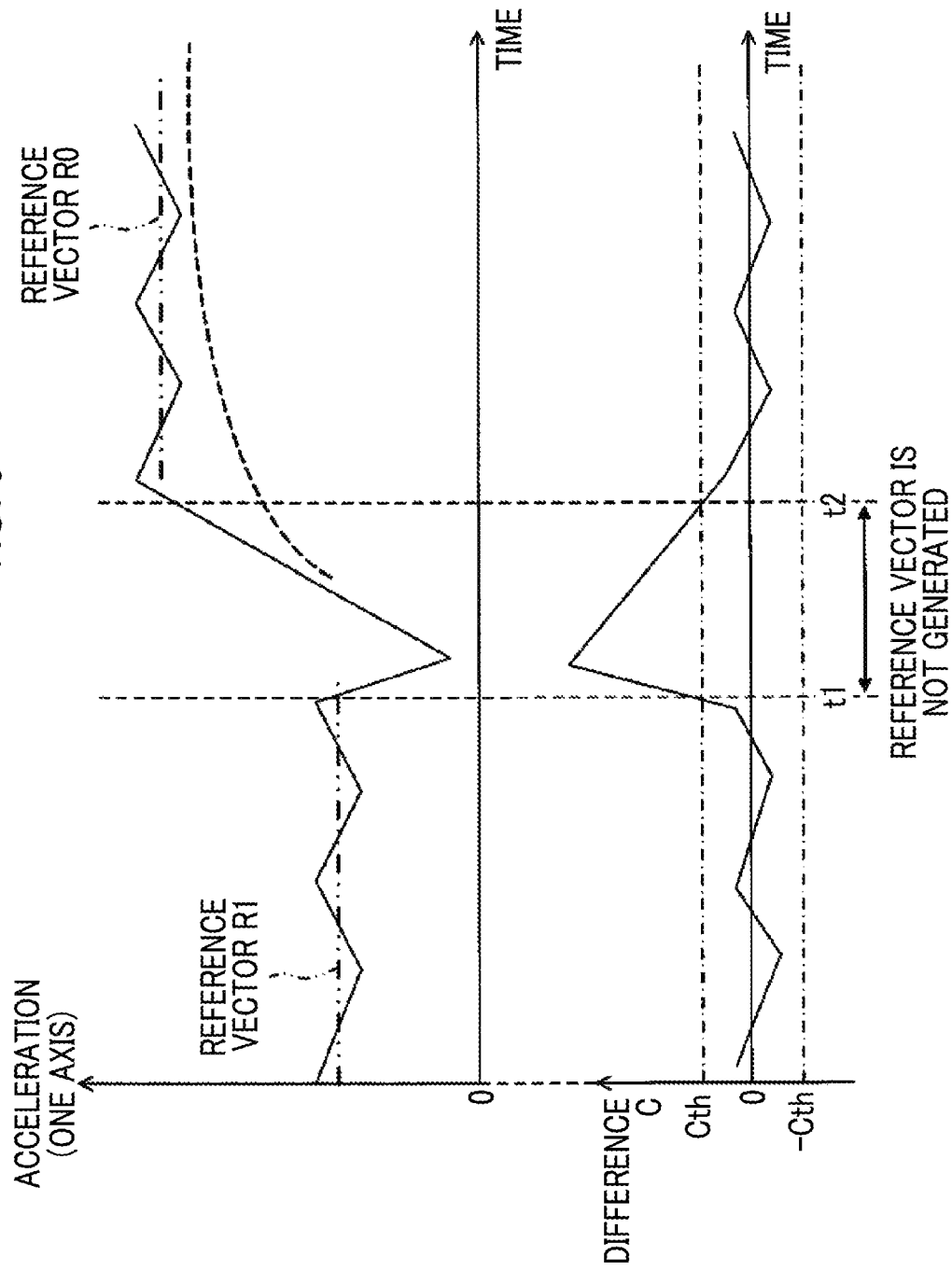
FIG. 6 is a diagram illustrating a change in the difference between the magnitude of a resultant vector and the magnitude of the acceleration of gravity over time and a change in acceleration in any one of the directions of three orthogonal axes and a reference vector over time.

FIG. 6 is a diagram illustrating a change in the reference vector R when the posture of the digital camera 1 is greatly changed in a state in which the reference vector R1 is used for the image blur correction process. In FIG. 6, the posture of the digital camera 1 is stable until a time t1. In an acceleration signal detected by the acceleration detection unit 20 in this state, gravity is dominant. Therefore, the reference vector generation unit 23 periodically calculates the reference vector R. For the period from the time t1 to a time t2 for which the user of the digital camera 1 intentionally changes the posture of the digital camera 1, in addition to gravity, acceleration generated by the change in the posture is added to the acceleration signal. In this case, the difference C between the magnitude |M| of the resultant vector M of the accelerations in the directions of the three orthogonal axes and the magnitude |G| of the acceleration of gravity is greater than the threshold value Cth. Therefore, the reference vector generation unit 23 does not calculate the reference vector R for the period from the time t1 to the time t2. After the time t2, the posture of the digital camera 1 is stable again and gravity is dominant in the acceleration signal. Therefore, the reference vector generation unit 23 calculates the reference vector R and a new reference vector R0 is obtained. After the time t2, the shake correction control unit 24 controls the process of correcting an image blur caused by the translational shakes on the basis of the accelerations in the directions of the three orthogonal axes, using the newly calculated reference vector R0.

A low-pass filtering process is performed for the reference vector R calculated by the reference vector generation unit 23. It is preferable to set a cutoff frequency to a low value in order to reduce the influence of noise in the process. However, when the cutoff frequency is low, it takes time for the reference vector R to follow a desired value, as represented by a dashed line in FIG. 6, in a case in which the reference vector R is calculated for the period from the time t1 to the time t2 for which the posture of the digital camera 1 is greatly changed. In this embodiment, as described above, the reference vector R is not calculated for the period from the time t1 to the time t2. Therefore, even when the cutoff frequency is set to a low value, it is possible to achieve the sufficient following performance of the reference vector R.

As described above, while the posture of the digital camera 1 is greatly changed, the reference vector is not calculated. The reference vector is calculated on the basis of the resultant vector of the accelerations obtained in a state in which the posture of the digital camera 1 is stable again. Therefore, it is possible to correct an image blur caused by translational shakes with high accuracy while appropriately following a change in the gravity direction.

The reference vector is calculated by the weighted average of the latest resultant vector obtained in a state in which the posture of the digital camera 1 is stable again and the past resultant vector or the past reference vector. Therefore, it is possible to accurately calculate the reference vector, considering past information.

The weight coefficient by which the latest resultant vector is multiplied and the weight coefficient by which the past resultant vector or the past reference vector is multiplied vary depending on a variation in the latest resultant vector from the past resultant vector or the past reference vector. As the variation becomes larger, the weight coefficient by which the latest resultant vector is multiplied is set to a larger value. Therefore, in a case in which a variation in the latest information related to acceleration from the past information is large, the proportion of the latest information used in the weighted average is high and the proportion of the past information used in the weighted average is low. Therefore, it is possible to accurately calculate the reference vector following a change in the gravity direction.

Figure 7:
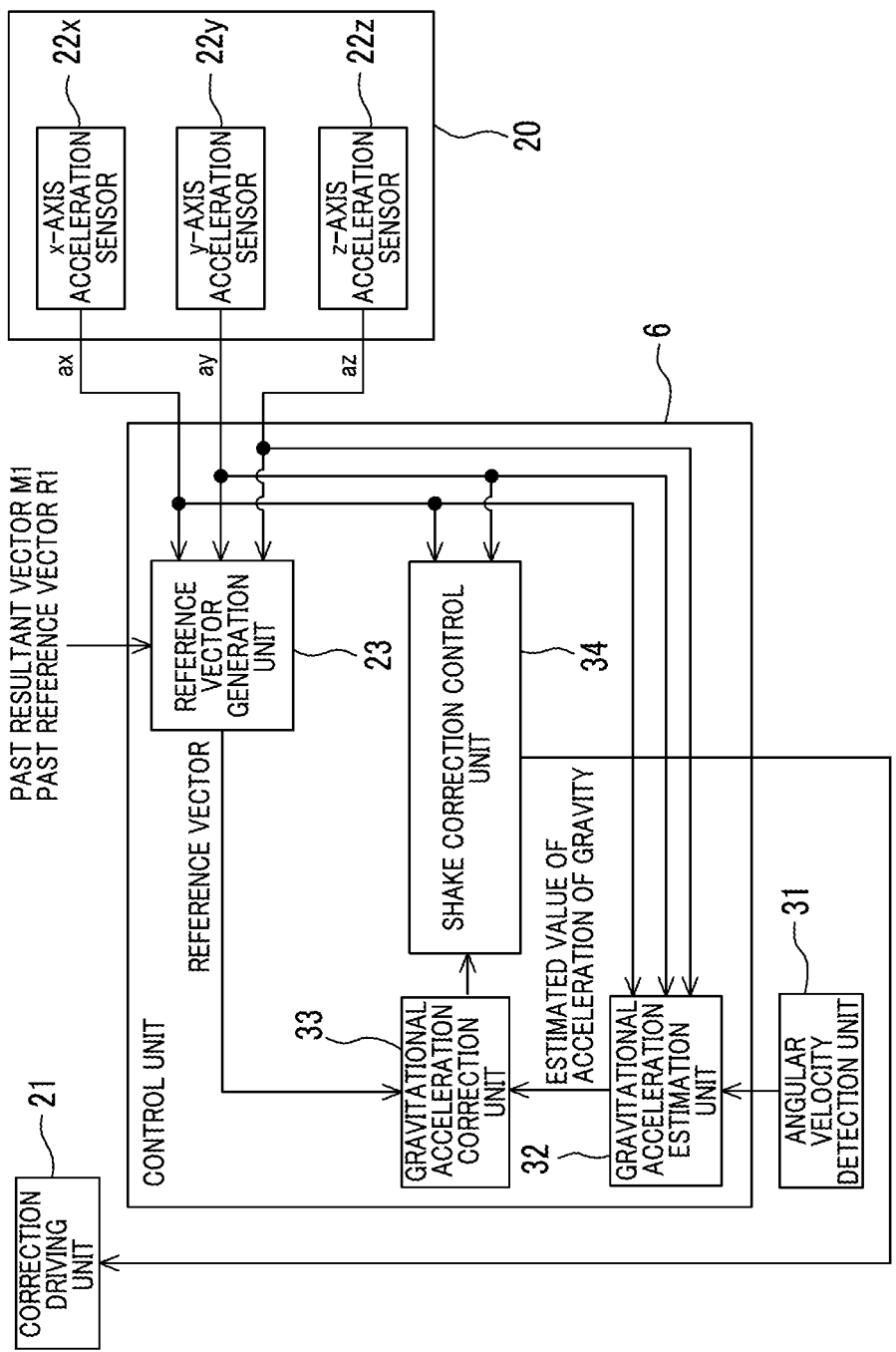
FIG. 7 is a diagram illustrating the structure of another example of the image blur correction system of the imaging apparatus illustrated in FIG. 1.

FIG. 7 illustrates another example of the functional block of the image blur correction system of the digital camera 1. The system includes an angular velocity detection unit 31 that detects the angular velocity of the digital camera 1 in the directions of three orthogonal axes. In FIG. 7, the same components (an acceleration detection unit 20 and a reference vector generation unit 23) as those in FIG. 3 are denoted by the same reference numerals and will be described in brief or the description thereof will not be repeated.

A control unit 6 includes the reference vector generation unit 23 that generates a reference vector of acceleration acting on the digital camera 1, a gravitational acceleration estimation unit 32, a gravitational acceleration correction unit 33, and a shake correction control unit 34 that controls a correction driving unit 21.

The gravitational acceleration estimation unit 32 calculates an estimated value of the acceleration of gravity applied to the acceleration detection unit 20 on the basis of the accelerations in the directions of three orthogonal axes detected by the acceleration detection unit 20 when the posture of the digital camera 1 is stable and the angular velocity in the directions of three orthogonal axes detected by the angular velocity detection unit 31, using the equation of motion of the digital camera 1 as an inertial body. The resultant vector of the accelerations in the directions of the x-axis, the y-axis, and the z-axis detected by the acceleration detection unit 20 when the posture of the digital camera 1 is stable corresponds to the acceleration of gravity. The resultant vector is rotated on the basis of an angular variation about each axis which is obtained by integrating the angular velocity about each of the x-axis, the y-axis, and the z-axis detected by the angular velocity detection unit 31 to estimate the acceleration of gravity in an inertial coordinate system including the x-axis, the y-axis, and the z-axis which is rotated in operative association with a change in the posture of the digital camera 1.

The gravitational acceleration correction unit 33 corrects the estimated value of the acceleration of gravity calculated by the gravitational acceleration estimation unit 32 on the basis of the reference vector calculated by the reference vector generation unit 23. In a case in which the posture of the digital camera 1 is continuously changed, acceleration other than gravity is continuously changed in the acceleration signal detected by the acceleration detection unit 20. In this case, it is difficult to track the direction of the acceleration of gravity from the acceleration signal. Therefore, the acceleration of gravity estimated on the basis of the angular velocity is effective. However, when an error in the angular velocity which is caused by the drift of a sensor used in the angular velocity detection unit 31 and is detected is accumulated, the amount of error in the estimated acceleration of gravity increases. Therefore, the gravitational acceleration correction unit 33 corrects the estimated value of the acceleration of gravity calculated by the gravitational acceleration estimation unit 32 on the basis of the reference vector calculated by the reference vector generation unit 23. In this way, the accumulation of errors in the detected angular velocity is prevented and the accuracy of the estimated value of the acceleration of gravity calculated by the gravitational acceleration estimation unit 32 is maintained.

Next, the calculation of the estimated value of the acceleration of gravity by the gravitational acceleration estimation unit 32 and the correction of the estimated value of the acceleration of gravity by the gravitational acceleration correction unit 33 will be described in detail.

Rotation matrices indicating rotation about the x-axis, the y-axis, and the z-axis in a three-dimensional space are represented by the following Expressions (1) to (3). Rx(θx) represented by Expression (1) is a rotation matrix in a direction from the y-axis to the z-axis. Ry(θy) represented by Expression (2) is a rotation matrix in a direction from the z-axis to the x-axis. In addition, Rz(θz) represented by Expression (3) is a rotation matrix in a direction from the x-axis to the y-axis. Here, θx, θy, and θz are rotation angles of each axial component of a rotation angle θ which is calculated from the angular velocity detected by the angular velocity detection unit 31.

$$Rx(\theta x) = \begin{bmatrix} 1 & 0 & 0 \\ 0 & \cos\theta x & -\sin\theta x \\ 0 & \sin\theta x & \cos\theta x \end{bmatrix} \quad (1)$$

$$Ry(\theta y) = \begin{bmatrix} \cos\theta y & 0 & \sin\theta y \\ 0 & 1 & 0 \\ -\sin\theta y & 0 & \cos\theta y \end{bmatrix} \quad (2)$$

$$Rz(\theta z) = \begin{bmatrix} \cos\theta z & -\sin\theta z & 0 \\ \sin\theta z & \cos\theta z & 0 \\ 0 & 0 & 1 \end{bmatrix} \quad (3)$$

In a case in which the digital camera 1 is rotated at arbitrary angles about each axis in the three-dimensional space, a resultant matrix Rxyz(θ) is obtained by the product of Rx(θx), Ry(θy), and Rz(θz).

The gravitational acceleration estimation unit 32 adds the resultant matrix Rxyz (θ) indicating the rotation of the digital camera 1 to a unit gravity vector G1(x, y, z) obtained before the posture of the digital camera 1 is changed to calculate a unit gravity vector G0(x, y, z) after the posture of the digital camera 1 is changed. The unit gravity vector indicates that the magnitude of a gravity vector is 1. The unit gravity vector G0(x, y, z) calculated by the gravitational acceleration estimation unit 32 is output as the estimated value of the acceleration of gravity.

Then, the gravitational acceleration correction unit 33 corrects the unit gravity vector G0(x, y, z) calculated by the gravitational acceleration estimation unit 32 on the basis of the reference vector R(x, y, z) calculated by the reference vector generation unit 23. The correction is performed in a case in which any one of the differences between the values of the axial component of the reference vector R(x, y, z) and the values of the same axial components of the unit gravity vector G0(x, y, z) is equal to or greater than a threshold value and is performed for all of the three orthogonal axes.

An example of a gravity vector G0a(x, y, z) corrected by the gravitational acceleration correction unit 33 is shown below. In addition, a is a coefficient.

$$G0a(x)=G0(x)+\alpha\{G0(x)-R(x)\}$$

$$G0a(y)=G0(y)+\alpha\{G0(y)-R(y)\}$$

$$G0a(z)=G0(z)+\alpha\{G0(z)-R(z)\}$$

The gravitational acceleration correction unit 33 outputs, as the corrected acceleration of gravity, a value which is obtained by multiplying the corrected gravity vector G0a(x, y, z) by the reciprocal of the magnitude of the corrected gravity vector G0a such that the corrected gravity vector G0a(x, y, z) is a unit vector.

The shake correction control unit 34 performs second-order integration for a difference value obtained by subtracting an x-axis component of the acceleration of gravity corrected by the gravitational acceleration correction unit 33 from the acceleration in the x-axis direction detected by the acceleration sensor 22x to calculate the amount of translational shake in the x-axis direction. Similarly, the shake correction control unit 34 performs second-order integration for a difference value obtained by subtracting a y-axis component of the acceleration of gravity corrected by the gravitational acceleration correction unit 33 from the acceleration in the y-axis direction detected by the acceleration sensor 22y to calculate the amount of translational shake in the y-axis direction.

Then, the shake correction control unit 34 calculates the amounts of movement of the movable lens 2a in the directions of the x-axis and the y-axis on the basis of the calculated amounts of translational shakes in the directions of the x-axis and the y-axis.

Then, the shake correction control unit 34 controls the correction driving unit 21 such that the movable lens 2a is moved in the directions of the x-axis and the y-axis by the calculated amounts of movement of the movable lens 2a. In this way, an image blur caused by the translational shakes of the digital camera 1 is corrected.

Figure 8:
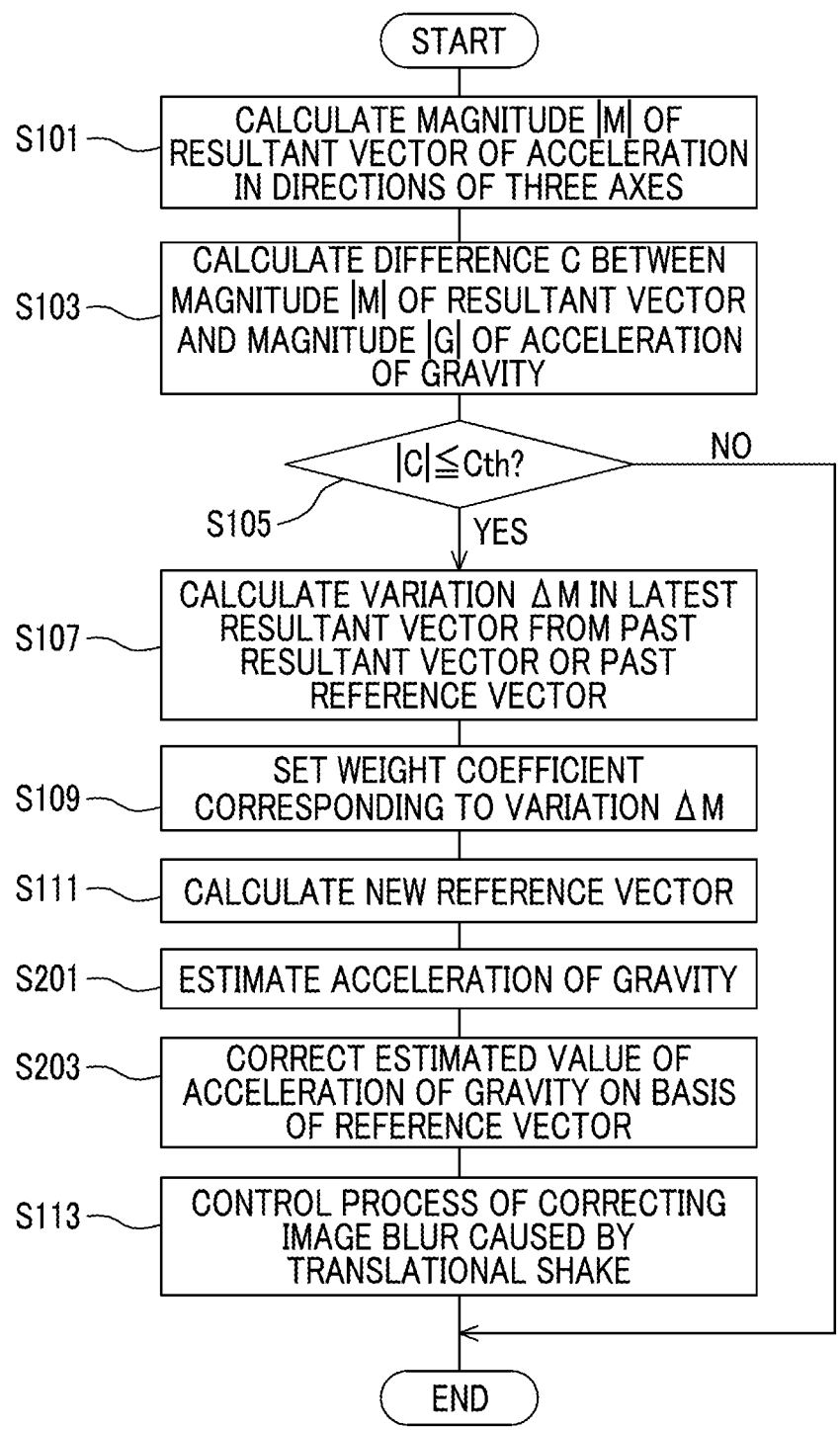
FIG. 8 is a flowchart illustrating the operation of the image blur correction system illustrated in FIG. 7.

FIG. 8 is a flowchart illustrating the operation of the image blur correction system illustrated in FIG. 7. In the flowchart illustrated in FIG. 8, Steps S201 and S203 are performed between Step S111 and Step S113 in the flowchart illustrated in FIG. 5. In Step S201, the gravitational acceleration estimation unit 32 calculates the estimated value of the acceleration of gravity applied to the acceleration detection unit 20. In Step S203, the gravitational acceleration correction unit 33 corrects the estimated value of the acceleration of gravity calculated in Step S201 on the basis of the reference vector calculated in Step S111.

In this way, even in a case in which the posture of the digital camera 1 is continuously changed, it is possible to correct an image blur caused by translational shakes with high accuracy while appropriately following a change in the gravity direction.

In this example comprising the angular velocity detection unit 31 that detects the angular velocity in the directions of three orthogonal axes, the amounts of movement of the movable lens 2a in the directions of the x-axis and the y-axis may be calculated on the basis of the amounts of translational shakes in the directions of the x-axis and the y-axis and the amounts of rotational shake about the directions of the x-axis and the y-axis and the movable lens 2a may be moved in the directions of the x-axis and the y-axis by the calculated amounts of movement of the movable lens 2a to correct an image blur caused by the translational shake and angular shake of the digital camera 1.

As illustrated in FIG. 6, for the period until the time t1 for which the posture of the digital camera 1 is stable and the reference vector generation unit 23 periodically calculates the reference vector R and for the period after the time t2, each axial component of the reference vector R may be subtracted from the accelerations in the directions of the x-axis and the y-axis detected by the acceleration detection unit 20 to calculate the amount of translational shake in each axial direction. For the period from the time t1 to the time t2 for which the posture of the digital camera 1 is greatly changed and the reference vector generation unit 23 does not calculate the reference vector R, each axial component of the estimated value of the acceleration of gravity which has been calculated by the gravitational acceleration estimation unit 32 and then corrected by the gravitational acceleration correction unit 33 may be subtracted from the accelerations in the directions of the x-axis and the y-axis detected by the acceleration detection unit 20 to calculate the amount of translational shake in each axial direction.

The digital camera 1 has been described above as an example of the imaging apparatus. Next, an embodiment of a smart phone with a camera as the imaging apparatus will be described.

Figure 9:
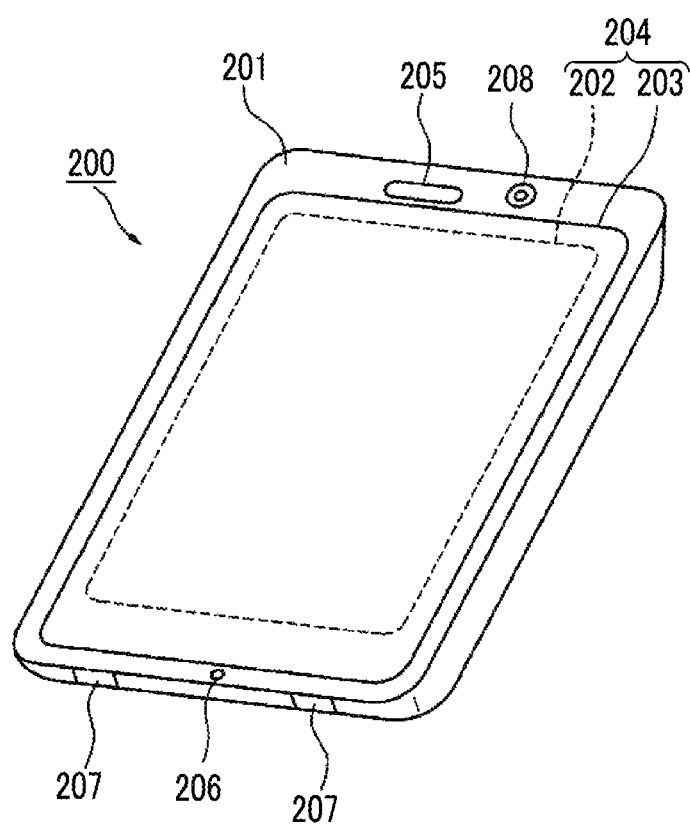
FIG. 9 is a diagram illustrating the outward appearance of another example of the imaging apparatus for describing the embodiment of the invention.

FIG. 9 illustrates the outward appearance of a smart phone 200 which is an embodiment of the imaging apparatus according to the invention.

The smart phone 200 illustrated in FIG. 9 includes a housing 201 with a flat panel shape. The smart phone 200 comprises a display input unit 204 having a display panel 202 as a display unit and an operation panel 203 as an input unit which are integrally formed on one surface of the housing 201. The housing 201 includes a speaker 205, a microphone 206, an operating unit 207, and a camera unit 208. However, the configuration of the housing 201 is not limited thereto. For example, the display unit and the input unit may be independently provided or the housing 201 may have a folding structure or a sliding structure.

FIG. 10 illustrates the structure of the smart phone 200 illustrated in FIG. 9.

As illustrated in FIG. 10, the smart phone 200 comprises, as main components, a wireless communication unit 210, the display input unit 204, a calling unit 211, the operating unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus BS (not illustrated) and a mobile communication network NW (not illustrated).

The wireless communication unit 210 performs wireless communication with the base station apparatus BS which is accommodated in the mobile communication network NW in response to an instruction from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and moving images) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 can be visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 9, the display panel 202 and the operation panel 203 of the smart phone 200 that is exemplified as an embodiment of the imaging apparatus according to the invention are integrated to form the display input unit 204 and the operation panel 203 is provided so as to completely cover the display panel 202.

In a case in which this structure is used, the operation panel 203 may have a function of detecting the user's operation even in a region other than the display panel 202. In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion. The width of the outer edge portion is appropriately designed according to, for example, the size of the housing 201. Examples of a position detection method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205. As illustrated in FIG. 9, for example, the speaker 205 can be mounted on the same surface as the display input unit 204 and the microphone 206 can be mounted on the side surface of the housing 201.

The operating unit 207 is a hardware key which uses, for example, a key switch and receives instructions from the user. For example, as illustrated in FIG. 9, the operating unit 207 is a push button switch which is mounted on the side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has a slot for a detachable external memory. The internal storage unit 217 and the external storage unit 218 forming the storage unit 212 may be implemented by a storage medium, such as a flash memory type, a hard disk type, a multimedia-card-micro-type memory, a card-type memory (for example, a MicroSD (registered trademark) memory), a random access memory (RAM), or a read only memory (ROM).

The external input/output unit 213 functions as an interface with all of the external apparatuses connected to the smart phone 200 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module (SIM) card/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives GPS signals transmitted from GPS satellites ST1 to STn and performs a position measurement process on the basis of a plurality of received GPS signals to detect a position including the latitude, longitude, and height of the smart phone 200, in response to an instruction from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to an instruction from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an instruction from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays an image on the display input unit 204 on the basis of image data (still image data or moving image data) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user through the operating unit 207 and the operation panel 203. The main control unit 220 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 202.

The main control unit 220 performs the operation detection control to detect the operation of the user input through the operating unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes the structures of the imaging optical system 2, the imaging element 3, the focusing unit 4, the focus driving unit 5, the control unit 6, the signal processing unit 7, the main memory 9, the acceleration detection unit 20, and the correction driving unit 21 in the digital camera 1 illustrated in FIG. 2.

The image data generated by the camera unit 208 can be recorded in the storage unit 212 or can be output through the external input/output unit 213 or the wireless communication unit 210.

In the smart phone 200 illustrated in FIG. 9, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

In addition, for example, the position information acquired by the GPS receiving unit 214, the voice information acquired by the microphone 206 (for example, the voice information may be converted into text information by the main control unit), and the posture information acquired by the motion sensor unit 215 may be added to still image data or moving image data and the image data may be recorded in the storage unit 212 or may be output through the external input/output unit 213 or the wireless communication unit 210.

In the smart phone 200 having the above-mentioned structure, it is also possible to correct an image blur caused by translational shakes with high accuracy while appropriately following a change in the gravity direction.

As described above, an imaging apparatus disclosed in the specification comprises: an acceleration detection unit that detects accelerations of the imaging apparatus in directions of three orthogonal axes; a reference vector generation unit that, in a case in which a difference between a magnitude of a resultant vector of the accelerations in the directions of the three orthogonal axes detected by the acceleration detection unit and a magnitude of acceleration of gravity is equal to or less than a predetermined threshold value, generates a reference vector using the resultant vector; and a shake correction unit that corrects an image blur caused by translational shakes in directions of two orthogonal axes perpendicular to at least an optical axis of an imaging optical system, using the reference vector, on the basis of the accelerations in the directions of the three orthogonal axes detected by the acceleration detection unit.

The shake correction unit corrects the image blur caused by the translational shakes in the directions of the two orthogonal axes perpendicular to at least the optical axis of the imaging optical system, on the basis of accelerations obtained by subtracting corresponding axial-direction components of the reference vector from the accelerations in the directions of the three orthogonal axes detected by the acceleration detection unit.

The imaging apparatus further comprises: a gravitational acceleration estimation unit that estimates acceleration of gravity in a coordinate system including the three orthogonal axes which is rotated in operative association with a change in the posture of the imaging apparatus; and a gravitational acceleration correction unit that corrects the acceleration of gravity estimated by the gravitational acceleration estimation unit on the basis of the reference vector. The shake correction unit corrects the image blur caused by the translational shakes in the directions of the two orthogonal axes perpendicular to at least the optical axis of the imaging optical system, on the basis of accelerations obtained by subtracting corresponding axial-direction components of the acceleration of gravity corrected by the gravitational acceleration correction unit from the accelerations in the directions of the three orthogonal axes detected by the acceleration detection unit.

The reference vector generation unit generates the reference vector on the basis of the latest resultant vector and a past resultant vector or a past reference vector.

The reference vector generation unit generates the reference vector, using a weighted average of the latest resultant vector and the past resultant vector or the past reference vector.

The reference vector generation unit changes a weight coefficient in the weighted average, depending on a variation in the latest resultant vector from the past resultant vector or the past reference vector.

An image blur correction method disclosed in the specification comprises: a generation step of, in a case in which a difference between a magnitude of a resultant vector of accelerations in directions of three orthogonal axes, which act on an imaging apparatus, and a magnitude of acceleration of gravity is equal to or less than a predetermined threshold value, generating a reference vector using the resultant vector; and a correction step of correcting an image blur caused by translational shakes in directions of two orthogonal axes perpendicular to at least an optical axis of an imaging optical system, using the reference vector, on the basis of the accelerations in the directions of the three orthogonal axes which act on the imaging apparatus.

In the correction step, the image blur caused by the translational shakes in the directions of the two orthogonal axes perpendicular to at least the optical axis of the imaging optical system is corrected on the basis of accelerations obtained by subtracting corresponding axial-direction components of the reference vector from the accelerations in the directions of the three orthogonal axes which act on the imaging apparatus.

The image blur correction method further comprises: an estimation step of detecting a change in the posture of the imaging apparatus and estimating acceleration of gravity in a coordinate system including the three orthogonal axes which is rotated in operative association with the change in the posture of the imaging apparatus; and a correction step of correcting the estimated acceleration of gravity on the basis of the reference vector. In the correction step, the image blur caused by the translational shakes in the directions of the two orthogonal axes perpendicular to at least the optical axis of the imaging optical system is corrected on the basis of accelerations obtained by subtracting corresponding axial-direction components of the corrected acceleration of gravity from the accelerations in the directions of the three orthogonal axes which act on the imaging apparatus.

In the generation step, the reference vector is generated on the basis of the latest resultant vector and a past resultant vector or a past reference vector.

In the generation step, the reference vector is generated by a weighted average of the latest resultant vector and the past resultant vector or the past reference vector.

In the generation step, a weight coefficient in the weighted average is changed depending on a variation in the latest resultant vector from the past resultant vector or the past reference vector.

This application is based on JP2014-258976, filed on Dec. 22, 2014, the content of which is incorporated herein by reference.

What is claimed is:

1. An imaging apparatus comprising:
   an acceleration detection unit that detects accelerations of the imaging apparatus in directions of three orthogonal axes;
   a reference vector generation unit that, in a case in which a difference between a magnitude of a resultant vector of the accelerations in the directions of the three orthogonal axes detected by the acceleration detection unit and a magnitude of acceleration of gravity is equal to or less than a predetermined threshold value, generates a reference vector using the resultant vector;
   a shake correction unit that corrects an image blur caused by translational shakes in directions of two orthogonal axes perpendicular to at least an optical axis of an imaging optical system, using the reference vector, based on the accelerations in the directions of the three orthogonal axes detected by the acceleration detection unit;

a gravitational acceleration estimation unit that estimates acceleration of gravity in a coordinate system including the three orthogonal axes which is rotated in operative association with a change in posture of the imaging apparatus; and a gravitational acceleration correction unit that corrects the acceleration of gravity estimated by the gravitational acceleration estimation unit based on the reference vector, wherein the shake correction unit corrects the image blur caused by the translational shakes in the directions of the two orthogonal axes perpendicular to at least the optical axis of the imaging optical system, based on accelerations obtained by subtracting corresponding axial-direction components of the acceleration of gravity corrected by the gravitational acceleration correction unit from the accelerations in the directions of the three orthogonal axes detected by the acceleration detection unit.

2. The imaging apparatus according to claim 1, wherein the shake correction unit corrects the image blur caused by the translational shakes in the directions of the two orthogonal axes perpendicular to at least the optical axis of the imaging optical system, based on accelerations obtained by subtracting corresponding axial-direction components of the reference vector from the accelerations in the directions of the three orthogonal axes detected by the acceleration detection unit.

3. The imaging apparatus according to claim 2, wherein the reference vector generation unit generates the reference vector based on a latest resultant vector which is the resultant vector being newly obtained, and a past resultant vector which is the resultant vector being previously obtained or a past reference vector which is the reference vector being previously generated.

4. The imaging apparatus according to claim 3, wherein the reference vector generation unit generates the reference vector, using a weighted average of the latest resultant vector and the past resultant vector or the past reference vector.

5. The imaging apparatus according to claim 4, wherein the reference vector generation unit changes a weight coefficient in the weighted average, depending on a variation in the latest resultant vector from the past resultant vector or the past reference vector.

6. The imaging apparatus according to claim 1, wherein the reference vector generation unit generates the reference vector based on a latest resultant vector which is the resultant vector being newly obtained, and a past resultant vector which is the resultant vector being previously obtained or a past reference vector which is the reference vector being previously generated.

7. The imaging apparatus according to claim 6, wherein the reference vector generation unit generates the reference vector, using a weighted average of the latest resultant vector and the past resultant vector or the past reference vector.

8. The imaging apparatus according to claim 7, wherein the reference vector generation unit changes a weight coefficient in the weighted average, depending on a variation in the latest resultant vector from the past resultant vector or the past reference vector.

9. An image blur correction method comprising:

a generation step of, in a case in which a difference between a magnitude of a resultant vector of accelerations in directions of three orthogonal axes, which act on an imaging apparatus, and a magnitude of acceleration of gravity is equal to or less than a predetermined threshold value, generating a reference vector using the resultant vector;

a first correction step of correcting an image blur caused by translational shakes in directions of two orthogonal axes perpendicular to at least an optical axis of an imaging optical system, using the reference vector, based on the accelerations in the directions of the three orthogonal axes which act on the imaging apparatus;

an estimation step of detecting a change in posture of the imaging apparatus and estimating acceleration of gravity in a coordinate system including the three orthogonal axes which is rotated in operative association with the change in the posture of the imaging apparatus; and a second correction step of correcting the estimated acceleration of gravity based on the reference vector, wherein, in the second correction step, the image blur caused by the translational shakes in the directions of the two orthogonal axes perpendicular to at least the optical axis of the imaging optical system is corrected based on accelerations obtained by subtracting corresponding axial-direction components of the corrected acceleration of gravity from the accelerations in the directions of the three orthogonal axes which act on the imaging apparatus.

10. The image blur correction method according to claim 9, wherein, in the second correction step, the image blur caused by the translational shakes in the directions of the two orthogonal axes perpendicular to at least the optical axis of the imaging optical system is corrected based on accelerations obtained by subtracting corresponding axial-direction components of the reference vector from the accelerations in the directions of the three orthogonal axes which act on the imaging apparatus.

11. The image blur correction method according to claim 10, wherein, in the generation step, the reference vector is generated based on a latest resultant vector which is the resultant vector being newly obtained and a past resultant vector which is the resultant vector being previously obtained or a past reference vector which is the reference vector being previously generated.

12. The image blur correction method according to claim 11, wherein, in the generation step, the reference vector is generated by a weighted average of the latest resultant vector and the past resultant vector or the past reference vector.

13. The image blur correction method according to claim 12, wherein, in the generation step, a weight coefficient in the weighted average is changed depending on a variation in the latest resultant vector from the past resultant vector or the past reference vector.

14. The image blur correction method according to claim 9,
wherein, in the generation step, the reference vector is generated based on a latest resultant vector which is the resultant vector being newly obtained and a past resultant vector which is the resultant vector being previously obtained or a past reference vector which is the reference vector being previously generated.

15. The image blur correction method according to claim 14,
wherein, in the generation step, the reference vector is generated by a weighted average of the latest resultant vector and the past resultant vector or the past reference vector.

16. The image blur correction method according to claim 15,
wherein, in the generation step, a weight coefficient in the weighted average is changed depending on a variation in the latest resultant vector from the past resultant vector or the past reference vector.

17. An imaging apparatus comprising:
an acceleration detection unit that detects accelerations of the imaging apparatus in directions of three orthogonal axes;
a reference vector generation unit that, in a case in which a difference between a magnitude of a resultant vector of the accelerations in the directions of the three orthogonal axes detected by the acceleration detection unit and a magnitude of acceleration of gravity is equal to or less than a predetermined threshold value, generates a reference vector using the resultant vector;
a shake correction unit that corrects an image blur caused by translational shakes in directions of two orthogonal axes perpendicular to at least an optical axis of an imaging optical system, using the reference vector, based on the accelerations in the directions of the three orthogonal axes detected by the acceleration detection unit;
wherein the reference vector generation unit generates the reference vector based on a latest resultant vector which is the resultant vector being newly obtained, and a past resultant vector which is the resultant vector being previously obtained or a past reference vector which is the reference vector being previously generated.

* * * * *